July 31, 1923.  1,463,574

F. E. CLEMONS

VEHICLE SUSPENSION

Filed Aug. 19, 1921

INVENTOR.
FREDERICK E. CLEMONS.
BY
ATTORNEYS.

Patented July 31, 1923.

1,463,574

UNITED STATES PATENT OFFICE.

FREDERICK E. CLEMONS, OF INDIANAPOLIS, INDIANA.

VEHICLE SUSPENSION.

Application filed August 19, 1921. Serial No. 493,709.

*To all whom it may concern:*

Be it known that I, FREDERICK E. CLEMONS, a citizen of the United States, and a resident of Indianapolis, county of Marion, and State of Indiana, have invented a certain new and useful Vehicle Suspension; and I do hereby declare that the following is a full, clear, and exact description thereof, reference being had to the accompanying drawings, in which like numerals refer to like parts.

This invention relates to vehicle suspension and the chief object thereof is to simplify the present standard elliptic spring suspension of motor vehicles by providing a unitary compact spring construction which not only is adapted to support the vehicle frame upon the vehicle wheels but also adapted to float said frame in an improved manner with a minimum amount of oscillation and to a greater degree than heretofore possible.

The chief feature of the invention consists in associating with a vehicle frame and a vehicle supporting wheel a plurality of oppositely acting yielding means to provide a full floating support which possesses the necessary strength for supporting purposes, yet permits a limited amount of relative movement between the vehicle frame work and the vehicle supporting wheel.

Another feature of the invention consists in the details of construction whereby the aforesaid object is accomplished with the use of a minimum amount of parts.

The full nature of this invention will be understood from the accompanying drawings and the following description and claims.

Figure 1:
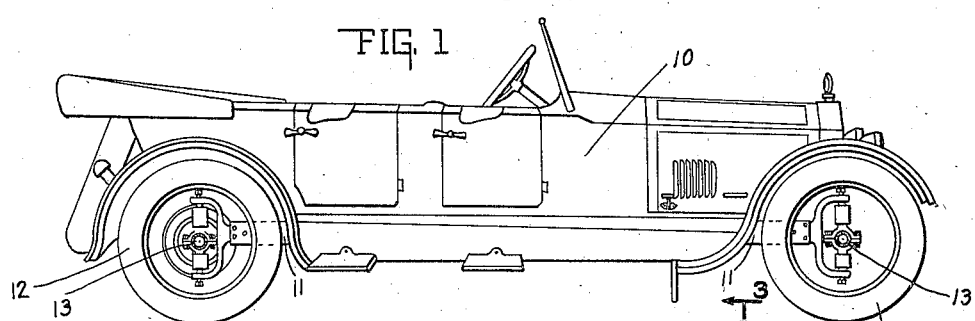
Figure 3:
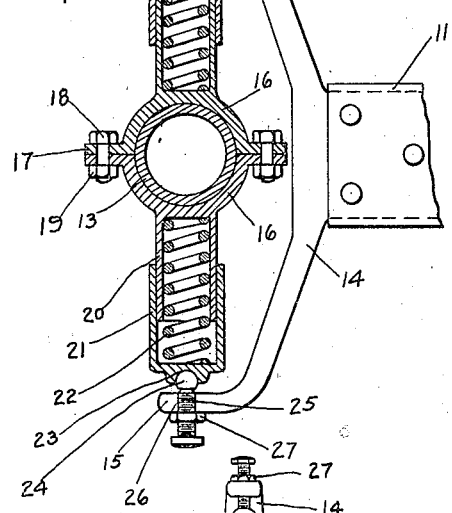
Figure 2:
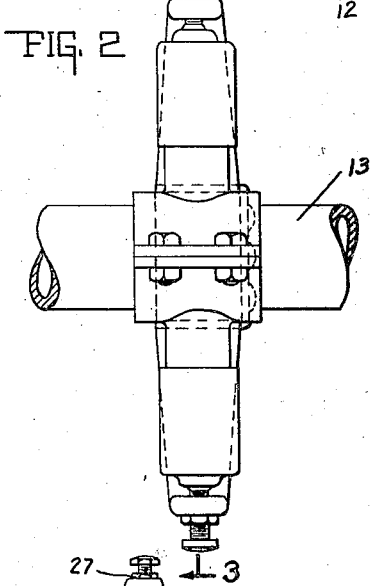
Figure 4:
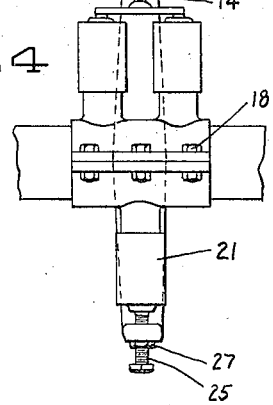
Figure 5:
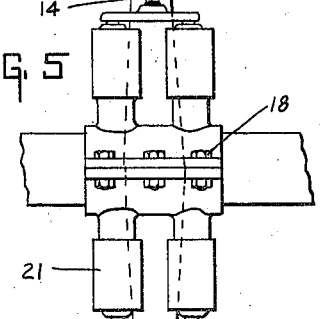

In the drawings Fig. 1 is a side elevational view of a motor vehicle showing the invention applied thereto. Fig. 2 is an enlarged side elevational view of the invention showing the same applied to the wheel supported member of a vehicle. Fig. 3 is a cross sectional view taken on the line 3—3 of Fig. 2 and in the direction of the arrows. Fig. 4 is an elevational view of a modified form of the invention. Fig. 5 is a similar view of another modification of the invention.

In the drawings 10 indicates a motor vehicle, such as a touring car, having the frame 11, front and rear wheels 12 and the axle or supporting spindles 13, and herein said axle or spindle is designated generally as a wheel supported member. Heretofore it has been customary to support the wheel supported member by suitable spring means, such as an elliptic spring construction to permit relative movement between the vehicle wheel and the supporting frame work 11. In the usual constructions the aforesaid customary elliptic spring support does not float the framework upon the vehicle wheel supported members, but yieldingly supports the same thereon so that relative movement of the vehicle wheels and the frame work is cumulative in that the same oscillates relative to each other until said oscillations are absorbed. Suitable shock absorbing means have been provided for absorbing said oscillations and thereby floating the framework upon the vehicle wheel supported members.

In the present invention the chief feature is the means whereby the framework is supported upon the vehicle wheel supported member so that the same will float and, therefore, the oscillating movement between said framework and said wheel supported member is absorbed. Herein a yoke member 14 is suitably secured to the framework 11 and each of the arms 15 provides a support for the floating construction. The wheel supported member 13 is herein shown circular in form and herein comprises a two part encircling construction designated by the numeral 16. Each of the encircling parts is provided with an outwardly extending flange 17 which is adapted to abut the adjacent flange 17 of the other encircling part, whereby said encircling construction may be quickly and easily secured to and upon the axle or spindle 13, by means of the bolts 18 and the nuts 19.

The yielding connection between the yoke and the aforesaid supporting construction comprises a radially extending tube 20, which is herein shown integral with the encircling construction 16. Telescoping said tube is a sleeve or housing 21 and within said tube and said housing there is positioned a coil spring 22. The end of the housing 21 terminates in a ball socket 23, in which is positioned a ball 24 having a threaded supported stem 25, receivable by the threaded opening 26 of the arm 15 of the yoke 14. A suitable lock nut 27 locks the stem in adjusted position upon the yoke.

It will be understood that in the embodiment shown in Figs. 2 and 3 of the drawings, the springs 22 are oppositely acting and the tubes 20 extend oppositely of each other, while the housings 21 extend towards each other and in this embodiment the members are in alignment. In Fig. 4, however, the modified form of the invention is illustrated as a pair of co-acting spring constructions opposed by a single spring construction. In Fig. 5 the construction shown in Fig. 2 is duplicated and, therefore, is adapted to support a heavier load.

The theory of operation of this contruction is that after the initial tension of the springs has been adjusted, the weight of the vehicle will be supported upon the wheel supported member 13 through the springs 22. Upon shock the wheel supported member 13 moves upwardly, see Fig. 3, compressing the upper spring 22 and permitting the lower spring 22 to extend. Upon rebound reverse action occurs, the lower spring being compressed and the upper spring being permitted to expand or extend. The strength of the springs is so calibrated and adjusted that the bound and rebound or relative movement between the framework 11 and the wheel 12 will be absorbed in substantially its initial movement by the oppositely acting springs 22.

While the invention has been described in great detail it will be readily understood that many modifications thereof will suggest themselves to those skilled in the art to which this invention applies and these modifications, as well as those herein illustrated, are all considered to be within the broad purview of this invention as outlined by the appended claims.

The invention claimed is:

1. In a vehicle, the combination with an axle, and a relatively rigid vehicle framework, of a plurality of radially extending yielding constructions connected to said axle at their inner ends for peripheral cushioning of the axle, and yoke means rigidly secured to said framework and connecting the outer ends of said constructions to said framework.

2. In a vehicle, the combination with an axle, and a relatively rigid vehicle framework, of a plurality of radially extending and oppositely positioned constructions connected to said axle for peripheral cushioning of the axle, and yoke means rigidly secured to said framework and connecting said constructions to said framework.

3. In a vehicle, the combination with an axle, and a relatively rigid vehicle framework, of a plurality of radially extending telescoping constructions, each connected at its inner end to said axle, cushion means associated with each telescopic construction, and non-yielding means rigidly connecting the other end of each of said telescopic constructions to the framework.

4. In a vehicle, the combination with an axle, and a relatively rigid vehicle framework, of a plurality of radially extending tubular members, each secured to said axle, a telescopic housing for each tubular member, a ball and socket connection supporting the other end of each of said housings upon said framework, and cushion means within each of said housings and said tubular constructions.

5. In a vehicle, the combination with an axle, and a vehicle framework, of a plurality of outwardly extending tubular members, each secured to said axle, a telescopic housing for each tubular member, a ball and socket connection supporting the other end of each of said housings, cushion means within each of said housings and said tubular constructions, and means for adjustably supporting each of said ball and socket constructions upon said framework.

6. In a vehicle, the combination of an axle, a plurality of members for surrounding said axle and adapted to be secured together in surrounding relation, a plurality of outwardly extending spring guide means, a similar number of inwardly extending spring guide means, a pair of inwardly and outwardly spring guide means being telescopically arranged, a spring associated with each telescopic pair of spring guide means, a yoke, a ball and socket connection between each inwardly extending spring guide means and said yoke, and adjustable means associated with said ball and socket connection.

7. In a vehicle, the combination of an axle, a yoke, a plurality of inwardly extending spring guide means connected at their outer ends to said yoke, a ball and socket connection between said outer ends and said yoke, adjustable means between said ball and socket connection and said yoke, a similar number of outwardly extending spring guide means connected at their inner ends to said axle, and a spring associated with each pair of inwardly and outwardly extending spring guide means, each pair being telescopically arranged.

In witness whereof, I have hereunto affixed my signature.

FREDERICK E. CLEMONS.